United States Patent [19]
Ferguson

[11] 3,761,149
[45] Sept. 25, 1973

[54] HYDROSTATIC RADIAL BEARING

[75] Inventor: Eric Tapley Ferguson, Emmasingel, Eindhoven, Netherlands

[73] Assignee: U.S. Philips Corporation, New York, N.Y.

[22] Filed: Sept. 27, 1971

[21] Appl. No.: 183,764

[30] Foreign Application Priority Data
Oct. 15, 1970   Netherlands...................... 7015119

[52] U.S. Cl. .............................................. 308/122
[51] Int. Cl. ........................................... F16c 17/16
[58] Field of Search........................... 308/9, 122 A

[56] References Cited
UNITED STATES PATENTS
3,357,759   12/1967   Stephenson........................ 508/122

*Primary Examiner*—Charles J. Myhre
*Assistant Examiner*—Frank Susko
*Attorney*—Frank R. Trifari

[57] ABSTRACT

A hydrostatic radial bearing having a housing with successive bearing segments in the circumferential direction. Each bearing segment comprises a pressure chamber and a raised edge which surrounds said chamber and together with the rotatable shaft forms an outflow gap. The pressure chambers are located partly beside each other and overlap each other in the circumferential direction. The outflow gaps have a resistance to flow which is variable in the circumferential direction; the resistance to flow varies in such manner that the forces exerted on the shaft by the pressure chambers, in response to a localized unevenness with respect to an imaginary line joining the center of the bearing to the center of one of the bearing segments.

4 Claims, 7 Drawing Figures

INVENTOR.
ERIC TAPLEY FERGUSON

BY
Agent

HYDROSTATIC RADIAL BEARING

The invention relates to a hydrostatic radial bearing having a shaft which is rotatable in a stationary housing. The housing has bearing segments which are located in pairs opposite to each other and succeed each other in the circumferential direction. Each bearing segment comprises a pressure chamber with a supply duct and a raised edge which surrounds said chamber forming an outflow gap with the shaft.

Bearings of this type are known but have the disadvantage that when the bearing shaft is not exactly circular, the axis of instantaneous rotation will continually vary relative to the bearing shaft. A high degree of accuracy of rotation can be obtained only, either by an extremely accurate finish of the bearing shaft, or by considerably increasing the number of bearing segments. Both solutions are expensive and the increased number of bearing segments has the additional drawback of a large number of necessary pre-restrictions, one for each pressure chamber, which easily get clogged.

It is the object of the invention to overcome these disadvantages and to provide a hydrostatic radial bearing which, in spite of a cheap and simple construction, has a high degree of accuracy of rotation.

According to the invention this object is achieved in that successive pressure chambers, partly situated beside each other, overlap each other in the circumferential direction. The outflow gaps have a resistance to flow which is variable in the circumferential direction. The forces exerted on the shaft by two oppositely located pressure chambers as a result of a localized unevenness are proportional to cos $\phi$, $\phi$ being an angle which denotes the instantaneous angular position of the unevenness with respect to an imaginary line which joins the center of the bearing to the center of one of the two pressure chambers.

As a result of the overlap of the pressure chambers, an unevenness on the circumference of the rotating shaft extending in the axial direction simultaneously influences two pressure chambers. The resultant force exerted on the shaft by successive pressure chambers as a result of the unevenness, is directed radially, is of a constant value and follows the shaft in its rotary movement. The shaft will rotate truly about an invariable axis of rotation which coincides with the center of the bearing.

In one embodiment of the bearing according to the invention the outflow gaps have a constant radial height, the variable resistance to flow being obtained by profiling the axial width of the outflow gaps which increases from the center of the bearing segment towards the two ends. By varying the width of the outflow gaps with constant height, the desired dependence of the forces exerted by the pressure chambers is obtained in a simple manner.

According to a preferred embodiment of the bearing according to the invention, in which the bearing comprises four bearing segments, each bearing segment covers substantially half the circumference of the bearing. In contrast with the known bearings, a very high accuracy of rotation can be obtained with only four bearing segments.

The varying width of the outflow gaps can be obtained by adapting the width of the bearing segments to the required width of the outflow gaps, the width of the pressure chambers being constant. According to a further preferred embodiment of the bearing according to the invention, however, the width of the pressure chambers decreases from the center towards the two ends, the bearing segments having a constant outer axial width. As a result a simple design of the bearing segments is obtained, while the pressure chambers and the raised edges of varying width surrounding said chambers can be profiled in a single operation.

In order that the invention may be readily carried into effect, embodiments thereof will be described in greater detail, by way of example, with reference to the accompanying drawings, in which.

Figure 1:
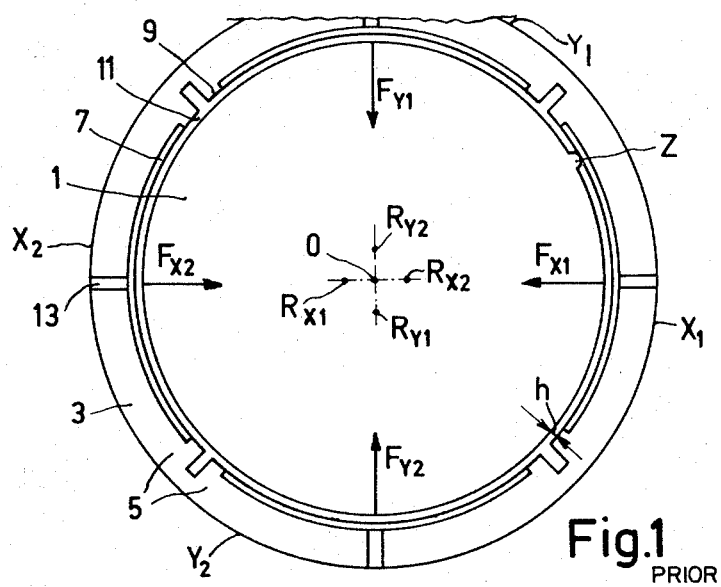
FIG. 1 is a cross-sectional view of a known hydrostatic radial bearing.
Figure 2:
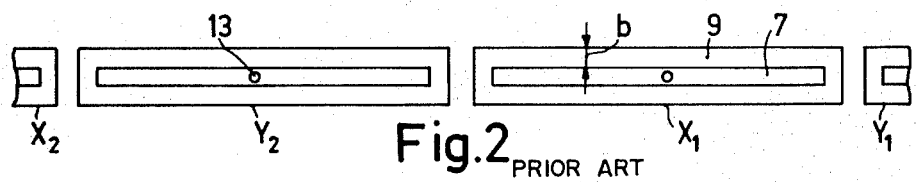
FIG. 2 is a developed view of the bearing segments of the bearings shown in FIG. 1.
Figure 3:
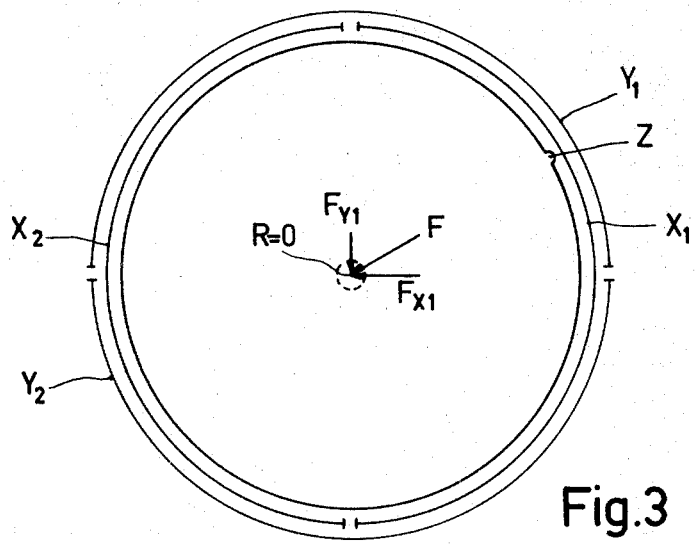
FIG. 3 is a diagrammatic cross-sectional view of an embodiment of the bearing according to the invention.
Figure 4:
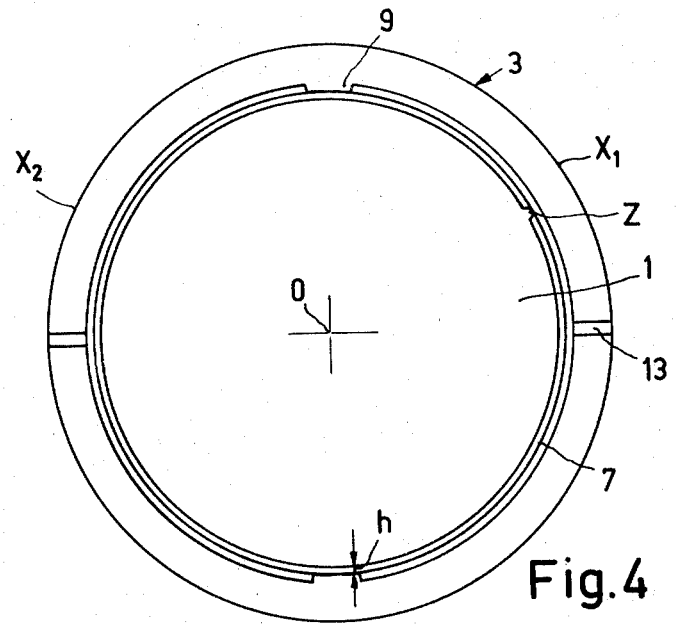
FIG. 4 is a cross-sectional view of the bearing taken on the line IV—IV of FIG. 6.
Figure 5:
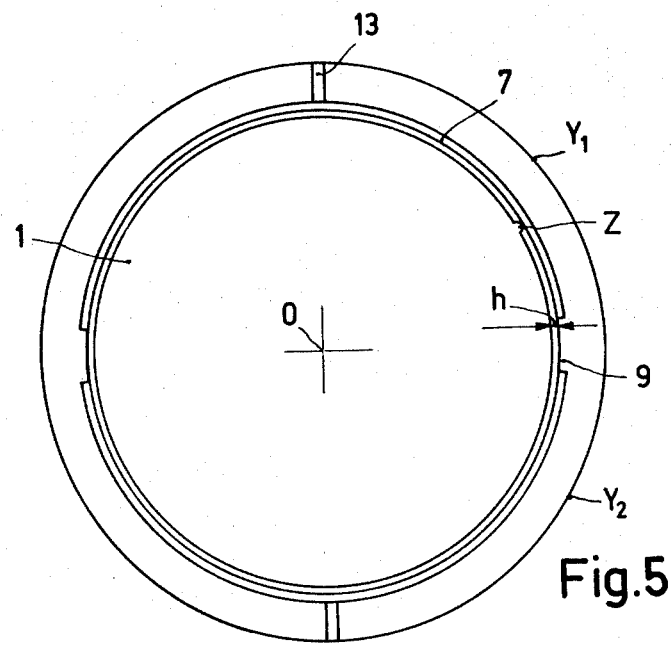
FIG. 5 is a cross-sectional view taken on the line V—V of FIG. 6.

FIGS. 1 and 2 show a known hydrostatic radial bearing having a shaft 1 which is rotatable in a stationary housing 3 which comprises four bearing segments 5 in the sequence $X_1, Y_1, X_2, Y_2$. Each bearing segment covers substantially a quarter of the circumference of the bearing and comprises a pressure chamber 7 around which a raised edge 9 is present which together with the shaft 1 form an outflow gap 11. Each bearing segment has a duct 13 for the supply of fluid under pressure. The outflow gaps have a constant radial height $h$ and a constant axial width $b$.

In the case of a truly circular shaft, each bearing segment would exert the same force $F_{x1}$, $F_{y1}$, $F_{x2}$, and $F_{y2}$ from the center of the bearing segment on the shaft. However, a shaft will usually not be truly circular. An unevenness on the circumference of the shaft 1 extending in the axial direction is shown in FIG. 1 on an exaggerated scale and is denoted by Z. When passing the bearing segment $X_1$, the unevenness Z only influences this bearing segment and the force $F_{x1}$ will increase. As a result of the force $F_{x1} - F_{x2}$ with constant direction, the shaft 1 is displaced in the direction of said force. As soon as the unevenness Z traverses the bearing segment $Y_1$, only this segment is influenced. The force $F_{y1}$ increases and the shaft 1 will be displaced by the force $F_{y1} - F_{y2}$ in a direction perpendicular to the force $F_{x1} - F_{x2}$. During traversing the other bearing segments, the shaft 1 is displaced by them in a similar manner. The axis of instantaneous rotation successively assumes the positions $R_{x1}, R_{y1}, R_{x2}$ and $R_{y2}$ denoted in FIG. 1.

FIGS. 3 to 6 show an embodiment of the bearing according to the invention, the housing 3 of which also comprises four bearing segments $X_1, Y_1, X_2$ and $Y_2$. The bearing segments $X_1$ and $X_2$ are located in a transverse plane IV—IV, while the bearing segments $Y_1$ and $Y_2$ are located in a parallel transverse plane V—V. Each bearing segment covers substantially half the circumference of the bearing so that two successive bearing segments will always overlap each other in the circumferential direction over an angle of substantially 90°. Each bearing segment comprises a pressure chamber 7 around which an upright edge 9 is present forming an outflow gap 11 with the shaft 1, the gap having a constant radial height $h$. In contrast with the known bearing shown in FIGS. 1 and 2, the width $b_x$ of the bearing segments $X_1$ and $X_2$ and $b_y$ of the bearing segments $Y_1$ and $Y_2$ increases from the center of each pressure chamber in the direction of the two ends. It may be assumed that the flow of the bearing liquid through the outflow gaps is truly axial. Near the center of each pressure chamber, the width $b_x$ and $b_y$ is small, so the contribution to the liquid supply is large; the unevenness Z will thus have a comparatively large influence. Near the ends of the pressure chambers, the width $b_x$ and $b_y$ is large and the contribution to the liquid supply thus is small; the unevenness Z will have only a slight influence on the liquid supply.

The unevenness Z simultaneously influences two bearing segments, in the position shown the bearing segments $X_1$ and $Y_1$. The bearing shaft 1 will rotate truly about a non-variable axis of rotation $R_{x1}$ located on the radius Z0 if the resultant F of the forces $F_{x1} - F_{x2}$ and $F_{y1} - F_{y2}$ exerted by the bearing segments $X_1$ and $Y_1$ for each angle $\phi$ occurs in the direction of Z0 and is of constant value. A necessary condition for this is that the force $F_{x1} - F_{x2}$ caused by Z is proportional to $\cos \phi$ and $F_{y1} - F_{y2}$ is proportional to $\sin \phi$.

This condition for the resultant F is satisfied by a suitable choice of the width $b_x$ and $b_y$ as a function of $\phi$, in which on an approximation $b_x$ is proportional to $1/\cos \phi$ and $b_y$ to $1/\sin \phi$. The shaft 1 is displaced by the constant resultant force F by a fixed amount in the direction Z0 and rotates about a non-variable axis of rotation R which coincides with the center 0 of the bearing.

Figure 6:
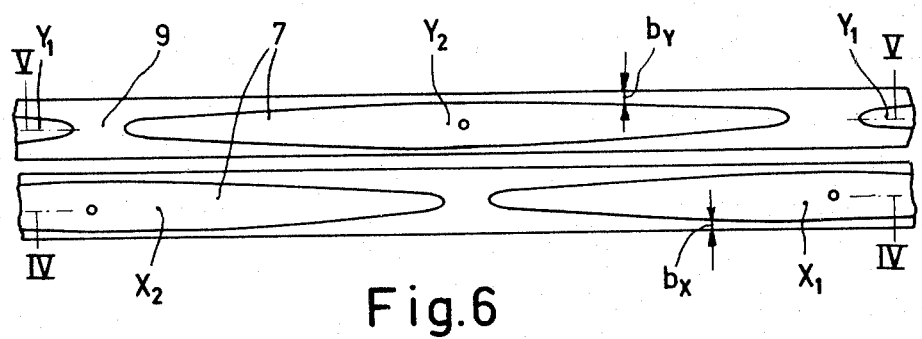
FIG. 6 is a developed view of the bearing segments of the bearing.

In the embodiment shown in FIG. 6, the bearing segments have a constant axial width, the width of the pressure chambers decreasing from the center towards the two ends.

Figure 7:
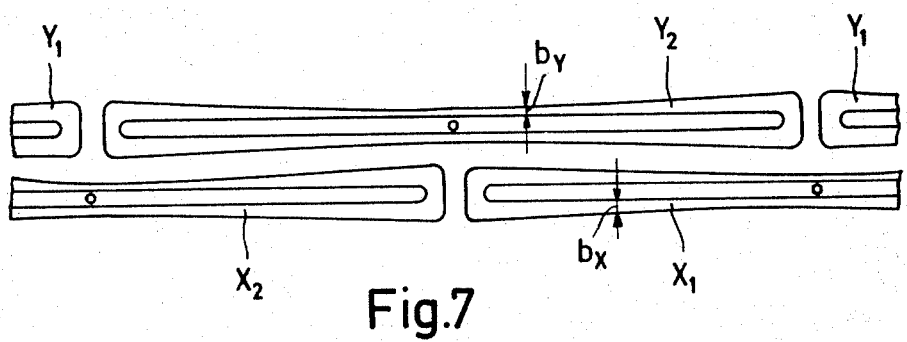
FIG. 7 is a developed view of another embodiment of the bearing according to the invention.

FIG. 7 shows another embodiment in which the width $b_x$ and $b_y$ of the outflow gaps varies similarly, the pressure chambers, however, having a constant width and the axial width of the bearing segments varying.

The invention is not restricted to bearings having four bearing segments. In a bearing having $2n$ bearing segments the pressure chambers are situated stepwise behind each other, $n$ pressure chambers being situated beside each other throughout the circumference and each pair of two oppositely located pressure chambers being located in a transverse plane. The forces exerted on the shaft by each pair of oppositely located pressure chambers as a result of the unevenness are proportional to $\cos \phi$, $\phi$ being an angle which indicates the angular position of the unevenness with respect to an imaginary line joining the center of the bearing to the center of one of the two pressure chambers.

Because of the high degree of accuracy of rotation, the bearing according to the invention is suitable for very accurate operations. The same accuracy of rotation as of the known bearings can be obtained with significantly lower cost. In all bearing constructions according to the invention the bearing segments located in the same plane can adjoin each other as is shown in FIG. 6, or be separated by a gap extending in the axial direction as shown in FIG. 7.

What is claimed is:

1. A hydrostatac radial bearing comprising a stationary housing having a shaft which is rotatable therein, bearing segments in said housing located in pairs opposite to each other and succeeding each other in the circumferential direction, each bearing segment comprising a pressure chamber, a supply duct connected to said chamber, and a raised edge which surrounds said chamber and together with the shaft forms an outflow gap, said successive pressure chambers overlapping each other in the circumferential direction, the outflow gaps having a resistance to flow which is variable in the circumferential direction, the forces exerted on the shaft by two oppositely located pressure chambers in response to a localized unevenness being proportional to $\cos \phi$, $\phi$ being an angle which denotes the instantaneous angular position of the unevenness with respect to an imaginary line joining the center of the bearing to the center of one of the pressure chambers.

2. A hydrostatic radial bearing as claimed in claim 1, wherein the outflow gaps have a constant radial height, the axial width of the outflow gaps being profiled so as to increase from the center of the bearing segments towards the two ends thereby providing the variable resistance to flow.

3. A hydrostatic radial bearing as claimed in claim 2, having four bearing segments, wherein each bearing segment covers substantially half the circumference of the bearing.

4. A hydrostatic radial bearing as claimed in claim 1 wherein the width of the pressure chambers decreases from the center towards the two ends, the bearing segments having a constant outer axial width.

* * * * *